(12) United States Patent
Kourtakis

(10) Patent No.: US 7,556,788 B2
(45) Date of Patent: Jul. 7, 2009

(54) PROCESS FOR PREPARING BORON CARBON NANORODS

(75) Inventor: Konstantinos Kourtakis, Media, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/868,209

(22) Filed: Oct. 5, 2007

(65) Prior Publication Data

US 2009/0092532 A1 Apr. 9, 2009

(51) Int. Cl.
*C01B 31/36* (2006.01)
(52) U.S. Cl. .................................................... 423/291
(58) Field of Classification Search .............. 423/291, 423/439; 977/788, 822, 900
See application file for complete search history.

(56) References Cited

U.S. PATENT DOCUMENTS

| 5,108,962 | A |   | 4/1992  | Khazai et al. |         |
|-----------|---|---|---------|---------------|---------|
| 5,338,523 | A | * | 8/1994  | Krstic        | 423/289 |
| 5,997,832 | A | * | 12/1999 | Lieber et al. | 423/249 |
| 6,190,634 | B1| * | 2/2001  | Lieber et al. | 423/439 |
| 6,911,260 | B2|   | 6/2005  | Ren et al.    |         |
| 2002/0074932 | A1 | | 6/2002 | Bouchard et al. |       |

OTHER PUBLICATIONS

Ma et al., "Investigation on the Growth of Coron Carbide Nanowires," 2002, Chem. Mater. 14, pp. 4403-4407.*
Wei et al., "Straight boron carbide nanorods prepared from carbon nanotubes", J. Mater. Chem., 12, 2002, pp. 3121-3124.
Zhang et al., "Growth and characterization of boron carbide nanowires", J. of Mater. Science Letters, 18, 1999, pp. 349-351.
Tsagareishvili et al., "Some physical properties of compacted specimens of highly dispersed boron carbide and boron suboxide", J. of Solid State Chemistry, 177, 2004, pp. 596-599.
Kroto et al., "C60: Buckminsterfullerene", Nature, vol. 318, 1985, pp. 162-165.
Kratschmer et al., "Solid C60: a new form of carbon", Nature, vol. 347, 1990, pp. 354-358.
Iijima et al., "Single-shell carbon nanotubes of 1-nm diameter", Nature, vol. 363, 1993, pp. 603-605.
Bethune et al., "Cobalt-catalysed growth of carbon nanotubes with single-atomic-layer walls", Nature, vol. 363, 1993, pp. 605-607.
Thess et al., "Crystalline Ropes of Metallic Carbon Nanotubes", Science, vol. 273, 1996, pp. 483-487.
Kong et al., "Synthesis of individual single-walled carbon nanotubes on patterned silicon wafers", Nature, vol. 395, 1998, pp. 878-881.
Hubert et al., High-Pressure, High-Temperature Syntheses in the B-C-N-O System, J. of Solid State Chemistry, 133, 1997, pp. 356-364.
Han et al., "Boron-doped carbon nanotubes prepared through a substitution reaction", Chemical Physics Letters, 299, 1999, pp. 368-373.

(Continued)

*Primary Examiner*—Wayne Langel
*Assistant Examiner*—Brittany M Martinez
(74) *Attorney, Agent, or Firm*—Gail D. Tanzer

(57) ABSTRACT

Disclosed is a process to prepare boron carbide nanorods wherein boron oxide is heated in the presence of nickel/boron supported on carbon.

4 Claims, 1 Drawing Sheet

OTHER PUBLICATIONS

Ma et al., "Thin boron nitride nanotubes with unusual large inner diameters", Chemical Physics Letters, 350, 2001, pp. 345-440.

McIlroy et al., "Electronic and dynamic studies of boron carbide nanowires", Physical Review B, vol. 60, No. 7, 1999, pp. 4874-4879.

* cited by examiner

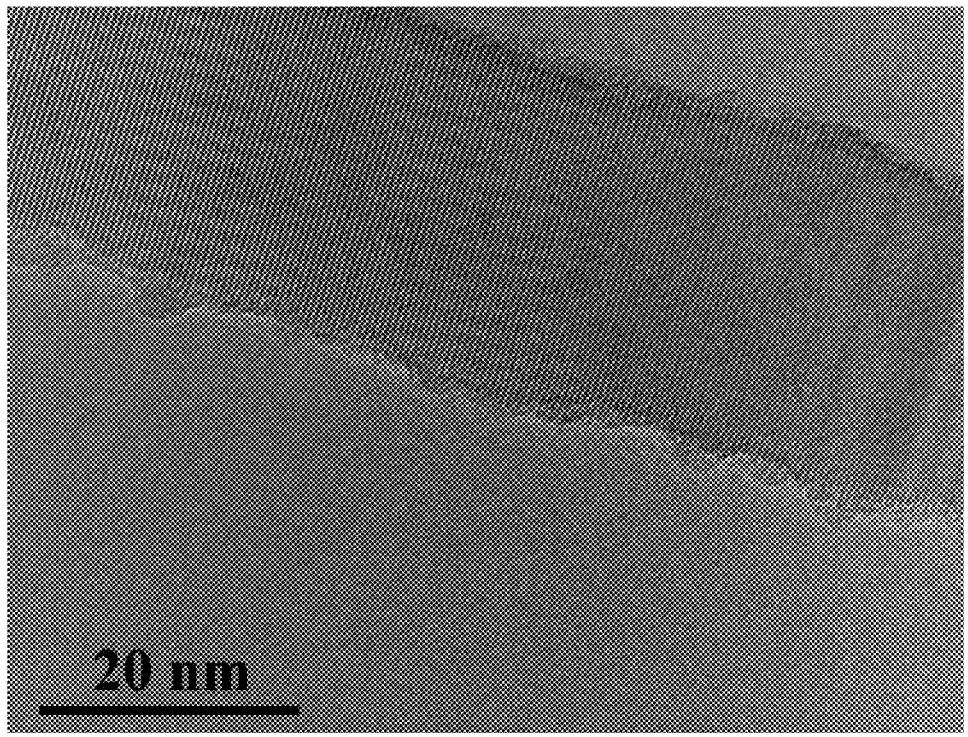

PROCESS FOR PREPARING BORON CARBON NANORODS

FIELD

Described is a process to prepare novel boron carbon nanorods.

BACKGROUND

Since the discovery of carbon nanotubes there has been much interest in the field of nanorods and nanowires. Boron based nanotubes have been studied by many researchers, particularly boron carbides (BC) nanostructures. Boron carbide nanowires have been prepared by many researchers but with B:C molar ratios of about 4:1, which is the equilibrium compound in the B—C system (see Wei et al, J. Mater. Chem., 2002, 12, 3121-3124; and Zhang et al, J. Mat. Sci. Lett, 18 (1999), 349). Boron carbide nanorods that are boron rich, however, would be expected display different electronic properties that could be valuable in many different applications U.S. Pat. No. 6,911,260 discloses carbon nanotubes that are reinforced with boron carbide nanolumps. $B_8C$ has been prepared by many researchers, but only in the form of films, discrete crystals, or powders (U.S. Pat. No. 5,108,962; Tsagareishvili et al, J. Solid State Chem., 177 (2004), 596).

Applicants have developed a process to prepare boron carbide nanorods with a molar ratio of 8:1 that are isolatable and that have potential uses in many fields.

SUMMARY

Disclosed is a process for preparing boron carbide nanorods by heating boron oxide in the presence of a reagent comprising nickel and boron supported on carbon. The nanorods thus produced have a boron to carbon molar ratio of 8 to 1.

Also disclosed is a boron carbide nanorod prepared by the process disclosed herein.

BRIEF DESCRIPTION OF DRAWINGS

The FIGURE is a TEM photograph of boron nanorods according to an embodiment of the invention.

DETAILED DESCRIPTION

Described herein is a process for preparing boron carbide nanorods comprising heating boron oxide in the presence of a reagent to produce boron carbide nanorods, wherein the reagent (also referred to herein as a "nickel containing reagent") comprises nickel and boron supported on carbon. The boron carbide nanorods thus produced have a boron to carbon molar ratio of 8:1; that is, the nanorods have a crystalline structure which corresponds to the crystalline phase $B_8C$.

By "nanorod" it is meant a nanoscale structure with at least one characteristic dimension less than about 100 microns. More specifically, it has a narrow dimension of about 1-200 nm and a long dimension, where the ratio of the long dimension to the narrow dimension, is at least 5. In general, the aspect ratio is between 10 and 2000. It may or may not have a circular cross-sectional shape. Nano-rods of the invention may also be called nanotubes or nanofibers.

As can be seen in the photograph of FIG. 1, taken by transmission electron microscopy, the nanorods described herein exhibit lattice lines and solid structure, indicating that the rods are not hollow and are solid.

The nanorods are conductive and therefore are useful as nanowires or molecular interconnects in the fabrication of nano-devices, or as other components of nano-devices. Other possible applications include conductive inclusions in conductive coatings and as point sources for emission in field-emission display devices, such as described by U.S. Patent Appl. 2002/0074932.

Although not wishing to be bound by theory, it is believed that the reaction proceeds in the following manner:

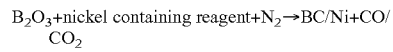

The carbon support can be from any source including but not limited to carbon black, graphite, activated charcoal, and other nanostructured carbons. Depending on the desired end-products, several methods are known in the art to produce different nanostructured forms of carbon. For example, laser ablation and arc-discharge processes have been used to vaporize carbon to produce buckminsterfullerenes, as disclosed by Kroto et al, in Nature, 318, 1985, 162; and Kratschmer et al, in Nature, 347, 1990, 354. Subsequently, arc-discharge experiments at higher pressures of inert gas were used to synthesize multi-walled carbon nanotubes in the growth that occurs on the face of the negative electrode, as disclosed by Iijima in Nature, 354, 1991, 56. Arc-discharge with anodes containing transition metals have been used to successfully synthesize single-walled nanotubes as well, as disclosed almost simultaneously by Iijima et al, and Bethune et al, in Nature, 363, 1993, 603 and 605, respectively. Subsequently, laser ablation as well as chemical vapor deposition experiments were also used to synthesize single-walled nanotubes, by Thess et al, Science, 273, 1996, 483; and Kong et al, Nature, 395, 1998, 878.

In one embodiment the carbon is a high surface area carbon black, which typically has a surface area at least 70 $m^2/g$. One type of suitable support is a Ketjen® (Akzo Nobel, Netherlands) carbon black. In some embodiments, the carbon has a surface area of 100 m2/g or even greater than greater than 100 m2/g.

The nickel containing reagent used to created the boron carbide nanorods can be prepared as follows. A nickel-containing precursor is contacted with particulate carbon by any method known in the art. One method involves dissolving a nickel-containing precursor in an appropriate solvent for the precursor (e.g., water or alcohol) and dispersing the nickel-containing precursor on the particulate carbon. Suitable nickel-containing precursors include water soluble salts containing nickel such as, for example, nickel chloride, nitrate, acetate, and acetylacetonate. For non-aqueous solvents, other organic complexes containing nickel can be used as nickel-containing precursors. For example, nickel carbonyl (Ni$(CO_4)$) or nickel dimethylgloxime (Ni$(HC_2H_6N_2O_2)_2$) can be used with an alcohol solvent. The nickel is present on the particulate carbon at about 0.01% to about 80% by weight of the carbon, more typically about 1% to about 40% by weight of the particulate carbon.

The nickel precursor which was combined with the particulate carbon, as described above, is reacted with a boron containing reagent, such as sodium borohydride, which can also serve to introduce boron into the composition. Following this reaction step, the material can be reduced by heating with hydrogen gas at a temperature of about 150° C. The atomic ratio of boron to nickel is typically from 0.5:1 to 2:1, with a ratio between 1 and 1.5:1 being preferred.

Additional boron can be added to the composition in the form of elemental boron and processed using ball milling or a similar mechanochemical process performed under a non-oxidizing environment such as $N_2$, Ar or hydrogen, to form the nickel containing reagent, which is used to create the boron carbide nanorods. A second reaction of the nickel containing reagent in hydrogen gas (at 150 C) can be performed following the mechanochemical process with boron powder to form the nickel containing reagent used to create the boron carbide nanorods of this invention precursor The nickel containing reagent, following ball milling or any mechanochemical step with elemental boron, can have a nominal stoichiometry with a boron to nickel ratio of >10:1, with >100:1 preferred.

To prepare the boron carbide nanorods, the boron oxide and the nickel containing reagent prepared as described above are combined, typically with simple mixing, and heated, typically under an inert atmosphere, e.g., under nitrogen, argon or helium. Typically it is preferred that the boron oxide is mixed in excess of the nickel containing reagent, such as at least a 4:1 weight ratio of boron oxide to nickel containing reagent. The process is performed at a temperature of at least about 900° C., desirably within the range of 900° C.-1300° C. The time of reaction can vary with reaction conditions and desired yield, but is generally about 1 to about 24 hours. Typically the temperature is increased slowly from ambient to the maximum temperature, before being held at the desired maximum temperature for the desired length of time.

The resulting boron carbide nanorods can be isolated from any unreacted reagents by any method known in the art. One procedure to remove the excess boron oxide, which may appear to form a fused lump with the product, is to wash the material with excess water, which will convert unreacted boron oxide to water soluble boric acid.

EXAMPLES

Example 1

Preparation of Nickel Containing Reagent

In a nitrogen purged drybox, 0.5 M solution of sodium borohydride was prepared by mixing 19 g of sodium borohydride in 1 liter of methanol. 100 ml of the borohydride solution was combined with 5 grams of high surface area carbon, Ketjen® 600 carbon (Akzo-Nobel). Excess liquid was decanted from this mixture.

15 ml of 2 M nickel chloride ($NiCl_2$, dissolved in methanol) was added, in a dropwise fashion, to the sodium borohydride/carbon mixture over the course of about 1 hour.

An additional 20 ml of the 0.5 M sodium borohydride solution was added, in a dropwise fashion and over the course with hour, with stirring.

The material was removed from the nitrogen purged drybox, and was washed three times with a solution of aqueous ammonium hydroxide.

The final material, after washing and air drying, was heated in flowing hydrogen gas ($H_2$) to a temperature of 150° C. for 8 hours.

Following this procedure (which produced a material of approximate composition 12 wt % $NiB_{1.2}$/C), 0.45 g of elemental boron was combined with 0.13 g of the this material (approximately 12 wt % $NiB_{1.2}$ on carbon) and mixed thoroughly by ball milling for about 9 hours. Approximately 3 mm zirconium oxide milling media were used for the dry ball milling operation.

Preparation of Boron Carbide 0.4012 of the material from above was combined with 3.227 g of boron oxide and placed in an aluminum oxide boat. The combined material was purged for 2 hours using high purity nitrogen gas and then heated at a rate of 5 C/minute to 900° C., then 2° C./minute to 1200° C. After heating for 2 hours at 1200° C., the material was cooled down (under flowing nitrogen) at a rate of 2° C./minute to 90° C., then 5° C./min to room temperature.

The material was subsequently washed with distilled water to remove unreacted boron oxide.

The final product contained approximately 30-50 volume % of the boron carbide nanorod product.

TEM was carried out by the following methodology. A nanorod sample was dispersed in pure ethanol by mild ultrasonication. A drop of the dispersion was placed on a holey-carbon coated transmission electron microscopy (TEM) grid (200 mesh/3 mm in diameter) and allowed to air dry. The grid was loaded onto a Philips CM-20 Ultratwin high-resolution TEM, which was operated at an accelerating voltage of 200 kV and configured with an Oxford (Link) windowless energy dispersive spectroscopy (EDS) system with a Si(Li) elemental detector. In the EDS analyses, electron-transparent thin sections of samples were used to minimize sample thickness effects such as fluorescence.

The FIGURE shows a TEM (transmission electron microscopy) photograph of the resulting nanorods, in which the lattice lines and solid structure can be seen, indicating that the rods are not hollow.

Nanowires were made from the nanorods by using AC dielectrophoeris, as described in Lumdson et al, Langmui 2005, 21, 4875-4880. Using this technique, the resistance was measured to be 950 kOhms across a length of about 25 microns. The wires that were measured have a diameter between 0.5-1.0 microns.

As observed by transmission electron microscopy, the specific lattice spacings observed were 4.81 Å, 4.48 Å, 4.21 Å and 2.696 Å, which correspond to the (201), (800), (221) and (841) reflections, respectively. These lattice spacings were compared to known reflections of boron carbides in the Powder Diffraction Files, International Centre for Diffraction Data, 1601 Park Lane, Swarthmore, Pa. 19081. The material was identified as PDF #26-0232, $B_8C$.

Comparative Example

A similar procedure as described in Example 1 was followed, except for the following differences. No sodium borohydride was used during the supportation of nickel chloride on Ketjen® 600 carbon. The nickel containing reagent was reduced at 400° C. in flowing hydrogen. No additional boron was added. Electron microscopy of the final product did not show boron carbide nanorods.

What is claimed is:

1. A process comprising heating under flowing inert gas boron oxide in the presence of a nickel containing reagent to produce boron carbide nanorods, wherein the nickel containing reagent comprises nickel and boron supported on particulate carbon, wherein the nanorods have a boron to carbon molar ratio of 8 to 1 and further, wherein the nickel containing reagent comprises about 1 to about 40 wt % by weight of the particulate carbon.

2. The process of claim 1 wherein the carbon is a particulate carbon having a surface area, as measured by the BET method, of at least 100 m$^2$/g.

3. The process of claim 1 wherein the process is performed at a temperature of at least about 900° C.

4. The process of claim 3 further comprising, prior to said heating, reducing the nickel containing reagent at a temperature of about 150° C.

* * * * *